March 12, 1963 F. HECK Re. 25,346

DEVICES FOR THE ROLLING OF STRIP FROM METAL POWDER

Original Filed April 30, 1956

Inventor:
F. Heck
By Glascock Downing & Seebold
Attys.

United States Patent Office

Re. 25,346
Reissued Mar. 12, 1963

25,346
DEVICES FOR THE ROLLING OF STRIP FROM METAL POWDER

Friedrich Heck, 19 Mollerskamp,
Hamburg-Bergedorf, Germany

Original No. 2,904,829, dated Sept. 22, 1959, Ser. No. 581,446, Apr. 30, 1956. Application for reissue Feb. 24, 1960, Ser. No. 10,825
Claims priority, application Germany May 16, 1955
5 Claims. (Cl. 18—9)

Figure 1:
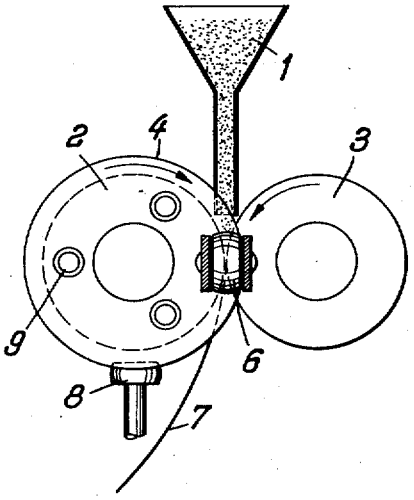

Matter enclosed in heavy brackets [ ] appears in the original patent but forms no part of this reissue specification; matter printed in italics indicates the additions made by reissue.

This invention relates to the design of a rolling mill for the manufacture of strip from metal powder. In devices of this nature the problem arises of achieving a uniform compression of the metal powder over the entire width of the cross-section. It is in this case particularly difficult to roll a strip whose edges are uniformly dense and of a rectangular shape. In the devices which have been proposed or disclosed in the past, there is frequently a reduction of the quantity of material along the edges, which produces notches at right angles to the direction of rolling, when the rolling of the sintered strip is continued. In such cases it is necessary to trim the edges of the manufactured strip, so that considerable losses occur.

According to the present invention, discs projecting beyond the edge of the roll are provided for the lateral limitation of the width of the material, where the discs are movable in the direction of the axis of the rolls, and can be pushed by means of pressure rollers or sliding shoes against the roll edge, in the neighbourhood of the gap between the rolls. The discs can be supported here on pins arranged laterally on the side of the roll body. It is in this case convenient to provide for slight play between these pins and the openings in the disc, so that the disc can follow easily the lateral pressure exerted against it. A support of this nature can also be achieved by making the discs engage with projections in grooves accommodated in the axial direction on the roll shafts.

In a preferred embodiment of the invention, the discs are made elastic. Also, at the back of the gap between the rolls pressure rollers are provided, which slightly lift the edge of the discs from the roll body. This ensures that the strip can be lifted without friction off the roll.

The strip edges, which are sensitive while the strip is in the raw state, are therefore protected.

The invention enables also the roll body faces to be reground without difficulty, which is not the case if fixed edge discs are employed, when grinding has an unfavourable effect on the play in the length of the roll body.

Figure 2:
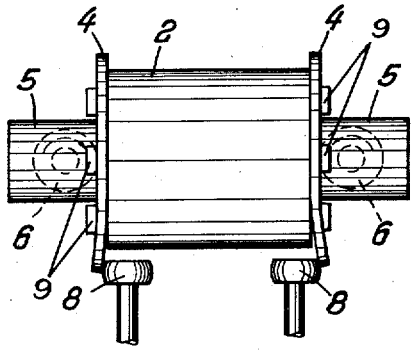
Figure 3:
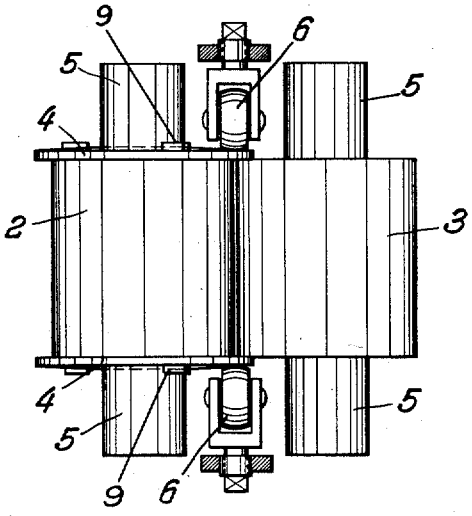

The drawing shows an example of an embodiment of the invention:

FIGURE 1 is a diagrammatic side view of the device;
FIGURE 2 is the front view; and
FIGURE 3 is the plan view.

A powder hopper is accommodated above the gap between the rolls, where the powder hopper can be given any desired shape and does not form an object of the invention. The two rolls 2 and 3 are arranged underneath the said powder hopper. The width of the gap between the rolls can be seen in FIGURE 3. On both sides of the roll 2, FIGURE 2, discs 4 are accommodated whose task is to limit the roll gap laterally, as shown in FIGURE 3. These discs 4 are supported on three pins 9 in such a way that they can move in the direction of the roll axis. Also, pressure rollers 6 in rolling contact with the discs 4 are arranged so that they exert a pressure against these discs 4 in the direction of the roll body. The rolls 2 and 3 are supported in the usual way by roll shafts 5. Pressure rollers 8 are provided at the back of the roll gap, which slightly lift the edge of the elastic disc 4 off the roll body, so that the strip 7 can be lifted off the roll without friction.

What is claimed is:

1. A rolling mill for producing metal strip from metal powder, comprising: at least two rolls, means for rotating the rolls, means for feeding metal powder to a gap between the rolls, two axially movable discs carried by one of the rolls, one disc being at each end of the roll, the radius of each disc exceeding the radius of the roll that carries it by an amount at least equal to the width of the roll gap, pressure rollers for pressing the discs against the ends of the disc-carrying roll in the neighbourhood of the roll gap, and pins extending from the ends of the disc-carrying roll parallel to the roll axis, the discs being freely slidable on these pins.

2. A rolling mill for producing metal strip from metal powder, comprising: at least two rolls, means for rotating the rolls, means for feeding metal powder to a gap between the rolls, two axially movable discs of elastic material carried by one of the rolls, one disc being at each end of the roll, the radius of each disc exceeding the radius of the roll that carries it by an amount at least equal to the width of the roll gap, means for pressing the discs against the ends of the disc-carrying roll in the neighbourhood of the roll gap, and rollers adapted to lift the edges of the discs away from the adjacent ends of the roll at a position beyond the roll gap.

*3. A rolling mill for producing metal strip from metal powder, comprising at least two rolls constituting a rolling mill, means for rotating the rolls, means for feeding metal powder through a roll gap between the rolls, two discs loosely mounted on opposite ends of said rolls for free axial movement therewith, the radius of each disc exceeding the radius of the roll that carries it by an amount at least equal to the width of the roll gap, and means for pressing each of said discs against the end of a roll on which said disc is mounted in the neighborhood of the roll gap.*

*4. The rolling mill of claim 3 also comprising means for shifting the edges of the discs away from the adjacent ends of the rolls at a position beyond the roll gap.*

*5. A rolling mill for producing metal strip from metal powder, comprising at least two rolls constituting a rolling mill, means for rotating the rolls, two discs mounted with respect to said rolls such that each disc is carried on the axis of one roll and is of sufficient diameter to extend across said roll gap and overlap the end of the other roll, one of said discs being mounted at each end of said roll gap, and means for urging each of said discs against the adjacent roll ends defining the end of said roll gap to limit the extent to which metal powder being rolled through said roll gap can spread axially of said gap.*

References Cited in the file of this patent
or the original patent

UNITED STATES PATENTS

| | | |
|---|---|---|
| 870,249 | Patterson | Nov. 5, 1907 |
| 1,185,399 | Hayes | Nov. 30, 1916 |
| 1,289,275 | Sargent | Dec. 31, 1918 |
| 1,361,970 | Dickey | Dec. 14, 1920 |
| 2,341,732 | Marvin | Feb. 15, 1944 |
| 2,349,829 | Nydegger et al. | May 30, 1944 |
| 2,397,608 | Johnson | Apr. 2, 1946 |
| 2,811,750 | Cofek | Nov. 5, 1957 |
| 2,817,875 | Harris et al. | Dec. 31, 1957 |